United States Patent
Lection et al.

(10) Patent No.: US 9,372,616 B2
(45) Date of Patent: Jun. 21, 2016

(54) SMART INTERACTIVE BOOKMARKS

(71) Applicant: International Business Machines Corporation, Armonk, NY (US)

(72) Inventors: David Bruce Lection, Research Triangle Park, NC (US); Ruthie D. Lyle, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 13/755,654

(22) Filed: Jan. 31, 2013

(65) Prior Publication Data

US 2014/0215376 A1   Jul. 31, 2014

(51) Int. Cl.
G06F 3/048       (2013.01)
G06F 3/0488      (2013.01)
G06F 3/0483      (2013.01)
G06F 3/0481      (2013.01)

(52) U.S. Cl.
CPC ............ *G06F 3/0488* (2013.01); *G06F 3/0483* (2013.01); *G06F 3/04817* (2013.01)

(58) Field of Classification Search
CPC .......................... G06F 15/0283; G06F 3/03547
USPC ......................................................... 715/776
See application file for complete search history.

(56) References Cited

U.S. PATENT DOCUMENTS

| | | | |
|---|---|---|---|
| 5,706,493 A | 1/1998 | Sheppard, II | |
| 7,540,406 B2 | 6/2009 | Song | |
| 8,118,224 B2 | 2/2012 | Barsness et al. | |
| 2003/0025731 A1 | 2/2003 | Chastain et al. | |
| 2005/0200116 A1 | 9/2005 | Chiu | |
| 2006/0085732 A1 | 4/2006 | Jiang et al. | |
| 2006/0294473 A1* | 12/2006 | Keely et al. | ........ 715/776 |
| 2007/0058944 A1 | 3/2007 | Millar | |
| 2008/0294674 A1 | 11/2008 | Reztlaff, II et al. | |
| 2009/0249244 A1* | 10/2009 | Robinson | ..... G06F 3/0481 715/781 |
| 2009/0251440 A1 | 10/2009 | Edgecomb et al. | |
| 2010/0042642 A1 | 2/2010 | Shahraray et al. | |
| 2010/0058166 A1 | 3/2010 | Chikyu | |
| 2010/0088726 A1 | 4/2010 | Curtis et al. | |
| 2010/0315359 A1 | 12/2010 | Seong et al. | |
| 2010/0324709 A1 | 12/2010 | Starmen | |
| 2011/0153331 A1 | 6/2011 | Dong et al. | |
| 2011/0231474 A1 | 9/2011 | Locker et al. | |
| 2011/0296295 A1 | 12/2011 | Hodges et al. | |
| 2012/0005617 A1* | 1/2012 | Lee | ..... G06F 17/30038 715/776 |
| 2012/0089911 A1 | 4/2012 | Hosking et al. | |
| 2012/0210269 A1* | 8/2012 | Yonemoto | ........ 715/776 |
| 2012/0240075 A1* | 9/2012 | Kim | ..... G06F 3/0481 715/776 |
| 2013/0002585 A1* | 1/2013 | Jee | ..... G06F 3/0488 345/173 |
| 2013/0179823 A1* | 7/2013 | Batarseh et al. | ........ 715/776 |

OTHER PUBLICATIONS http://www.openbookmarks.org/social-reading/.

* cited by examiner

*Primary Examiner* — Kieu Vu
*Assistant Examiner* — Joy M Weber
(74) *Attorney, Agent, or Firm* — Derek S. Jennings; Patent Mining Works, LLC

(57) ABSTRACT

A method includes, a computer generating at least one bookmark to provide an indication of placement, the computer configuring the at least one bookmark to have multiple functions; and the computer configuring the at least one bookmark to have an image based the placement.

21 Claims, 6 Drawing Sheets

SMART INTERACTIVE BOOKMARKS

BACKGROUND

The present invention relates to electronic bookmarks, and more specifically, to interactive bookmarks.

SUMMARY

According to one aspect of the present invention, a method includes, a computer generating at least one bookmark to provide an indication of placement; the computer configuring said at least one bookmark to have multiple functions; and the computer configuring said at least one bookmark to have an image based said placement.

According to another aspect of the present invention, a computer system includes, one or more processors, one or more computer-readable memories and one or more computer-readable, tangible storage devices; a first module operatively coupled to at least one of the one or more storage devices for execution by at least one of the one or more processors via at least one of the one or more memories, configured to generate at least one bookmark to provide an indication of placement; a second module coupled to at least one of the one or more storage devices for execution by at least one of the one or more processors via at least one of the one or more memories, configured to provide said at least one bookmark with multiple functions; and a third module operatively coupled to at least one of the one or more storage devices for execution by at least one of the one or more processors via at least one of the one or more memories, configured to provide said at least one bookmark with an image based upon said placement.

According to another aspect of the present invention, a computer program product includes: one or more computer-readable, tangible storage medium; program instructions, stored on at least one of the one or more storage medium, to generate at least one bookmark to provide an indication of placement, program instructions, stored on at least one of the one or more storage medium, to provide said at least one bookmark with multiple functions, and program instructions, stored on at least one of the one or more storage medium, to provide said at least one bookmark with an image based upon placement for said at least one bookmark.

DETAILED DESCRIPTION

Figure 1:
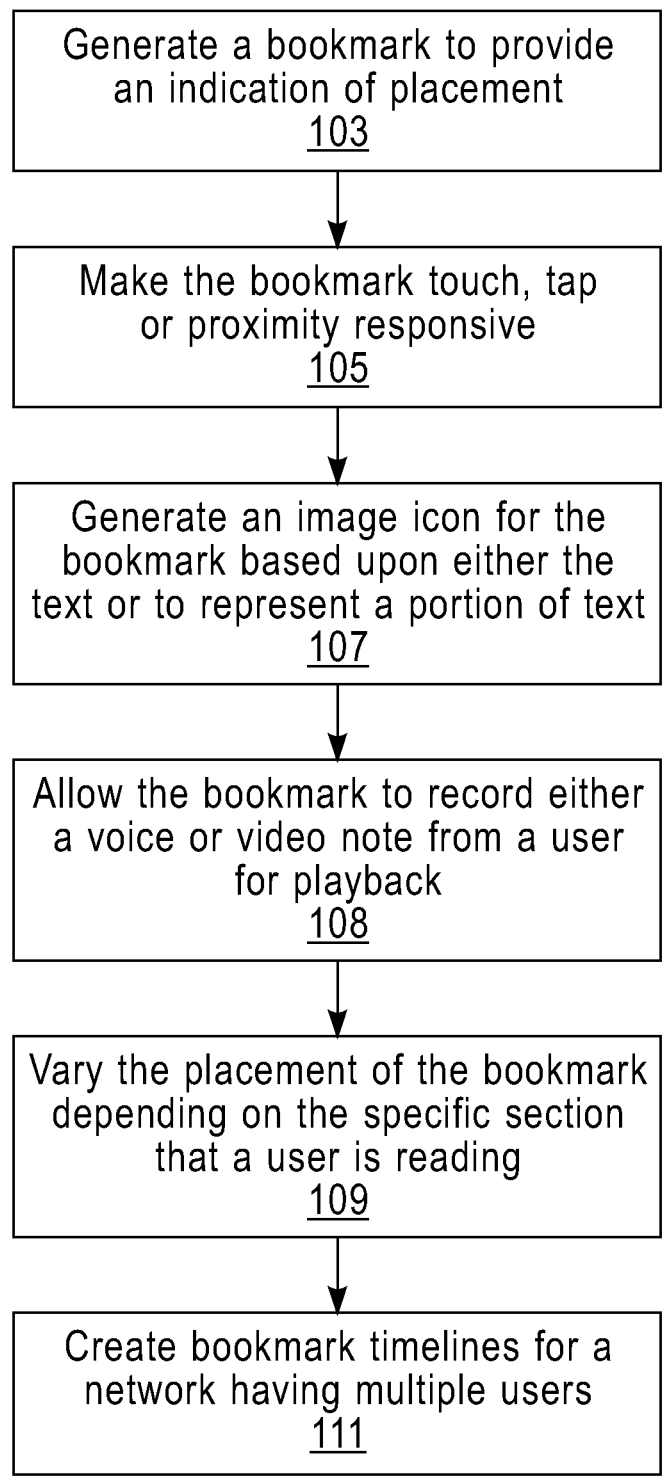
FIG. 1 shows a flowchart according to an embodiment of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. As will be appreciated by one skilled in the art, aspects of the present invention may be embodied as a system, method or computer program product.

With reference now to FIG. 1, a flowchart includes generating bookmarks on electronic devices to provide an indication of placement (103). The process further includes making the bookmark either touch, tap or proximity responsive (105). The bookmark produces different effects based on either if a user touches or taps the bookmark. If the user touches, but does not tap a bookmark, the bookmark will display additional text at the bookmark location. Giving the user further insight as to the location of the bookmark. When a user taps the bookmark the electronic device navigates to the bookmarks location. The bookmark can produced yet another different effect based up a user's finger proximity to the bookmark. When the user's finger or stylus comes into proximity with one or more bookmarks, then the text output(s) will be rendered with audio. As the user's finger approaches particular bookmark, then that single audio output will be heard. In this way the user can user their finger and hearing to navigate to a bookmark without deep visual focus on the bookmark icon. It should be noted another embodiment of the present invention allows the bookmark to be proximity responsive to any object under the control of a user.

The process continues by generating an icon for the bookmark (107). The icon can be based upon either text or can represent a portion of text. If the user chooses nouns to select icons, then the sentence at the bookmark is analyzed for the noun that is the subject of the sentence. An icon is selected that represents the noun. For example if the following sentence "The tall Christmas tree" was at a bookmark, then an icon depicting a Christmas tree will be selected. Alternative similar methods can apply to verbs, with the icons showing some action.

Still referring to FIG. 1, the bookmarks may further include the functionality of allowing audio or video notes from a user, depending on the electronic device being used (108). The audio and/or video recording can be helpful to others reading the same text. This feature will be described in more detail with reference to FIG. 4.

The process for controlling the bookmarks placement depends on what section a user is reading (109). As the user navigates the text on the electronic device, the bookmark moves up and down the side to indicate the relative position of the bookmark from a current text. The bookmark further moves to the "left" or "right" of the current text. If the user flips pages to arrive at the text of the book that is after a set bookmark, the bookmark will then move to the left hand side. This gives the user insight into the position of each bookmark within the book.

The final process according to an embodiment of the present invention is to create bookmark timelines for a network having multiple users (111). With the advent and explosion of social media and the web, several people may be reading the same text. The current process allows multiple users to read the bookmarks of others. This feature will be further described with reference to FIG. 4.

Figure 2A:
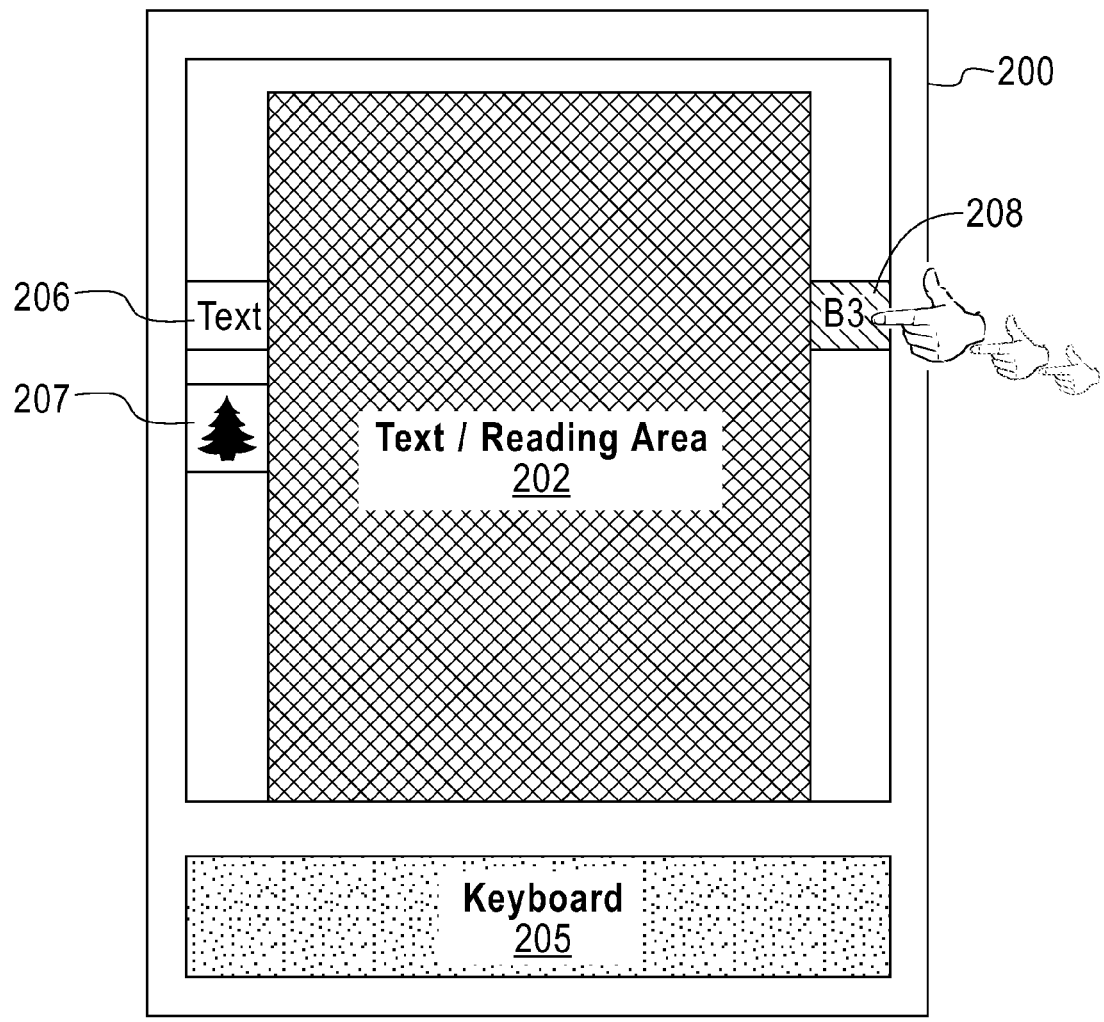
FIG. 2A illustrates an exemplary implementation according to an embodiment of the present invention.
Figure 2B:
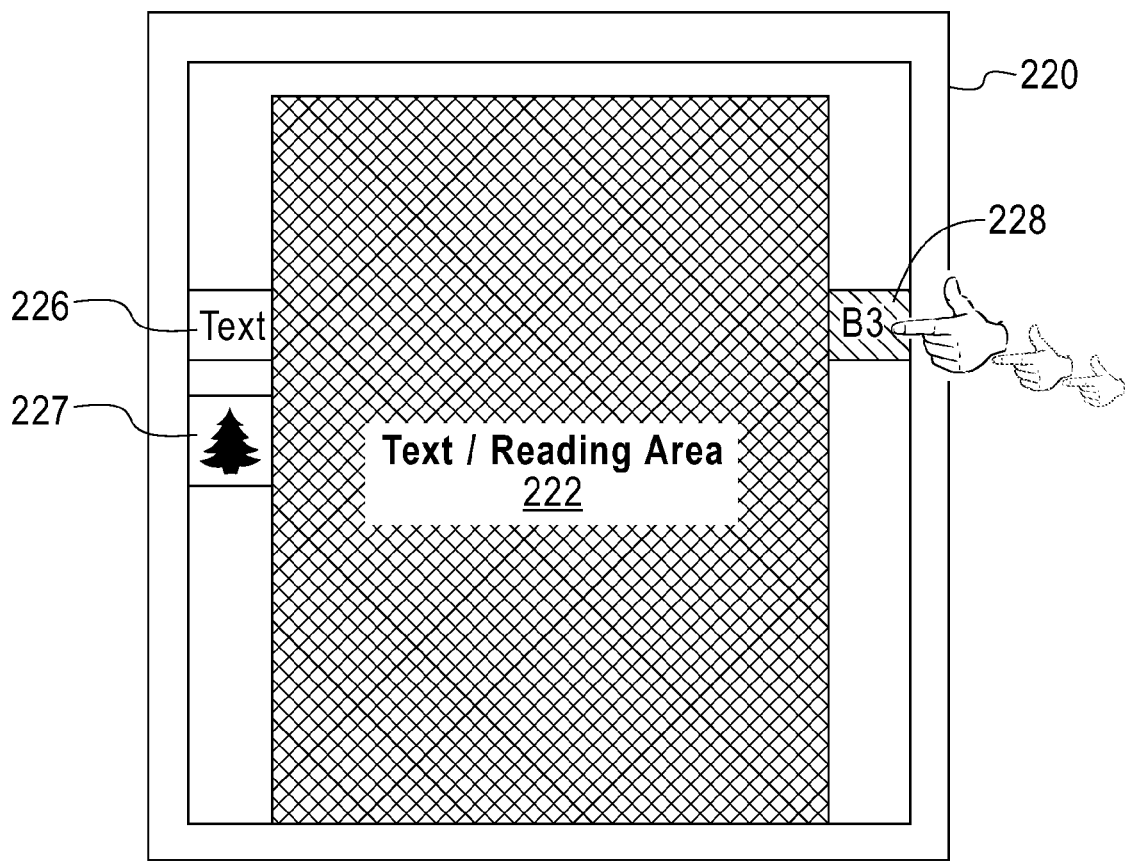
FIG. 2B illustrates another exemplary implementation according to an embodiment of the present invention.

Referring to FIGS. 2A and 2B, shown are exemplary implementations according to an embodiment of the present invention. An eBook reader 200 includes a display 202 for reading text. A keyboard 205 allows for text or search entry. The eBook reader 200 is shown with bookmarks 206, 207 and 208. As shown, bookmarks 206 and 207 are positioned as being before the current text page. Bookmark 207 is closer to the current page than bookmark 206. The position for bookmark 208 indicates it is placed after the current page text. Another electronic device 220 is shown FIG. 2B. The device 220 may be either an eBook reader, a computer tablet or a mobile communication device. The device 220 includes a touch display 222 for reading text or inputting text. The device 220 is shown with bookmarks 226, 227 and 228. As shown, bookmarks 226 and 227 are positioned as being before the current text page. Bookmark 227 is closer to the current page than bookmark 226. The position for bookmark 228 indicates it is placed after the current page text. The plurality of bookmarks are placed in sequential order based on their closeness to the current user's viewing text, wherein the plurality of bookmarks when positioned on a Y-axis provide an indication of a Z-axis depth placement based upon their closeness to the current user's viewing text. Bookmarks 207 and 227, which are centered on the Y-axis, provide the indication as being the bookmarks which are closest to the current text page.

Figure 3:
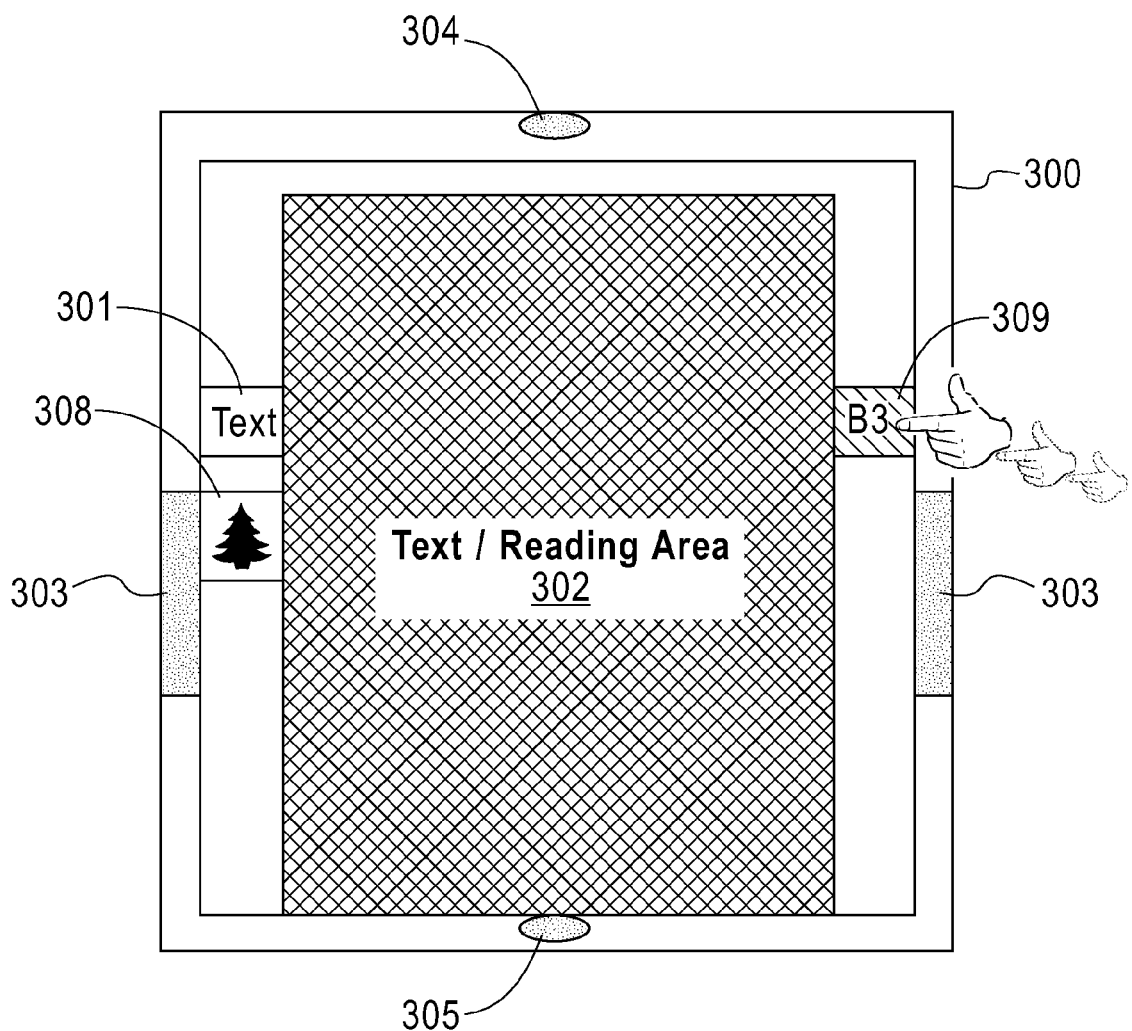
FIG. 3 illustrates still another exemplary implementation according to an embodiment of the present invention.

Referring to FIG. 3, shown is another exemplary implementation according to an embodiment of the present invention. The device 300 may be either an eBook reader, a computer tablet or a mobile communication device. The device 300 includes a touch display 302 for reading text or inputting text. The device 300 also may contain a pair of speakers 303, a camera 304 and a microphone 305. The device 300 is shown with bookmarks 301, 308 and 309. As shown, bookmarks 301 and 308 are positioned as being before the current text page. Bookmark 308 is closer to the current page than bookmark 301. The position for bookmark 309 indicates it is placed after the current page text. The camera 304 and the microphone 305 can be used to record a recordable media item. The recordable media item can include voice, audio, video, or video with included audio for providing annotations for the bookmarks. Once the annotations have been recorded playback can be viewed on the touch screen 302 and be heard via the speakers 303.

Figure 4:
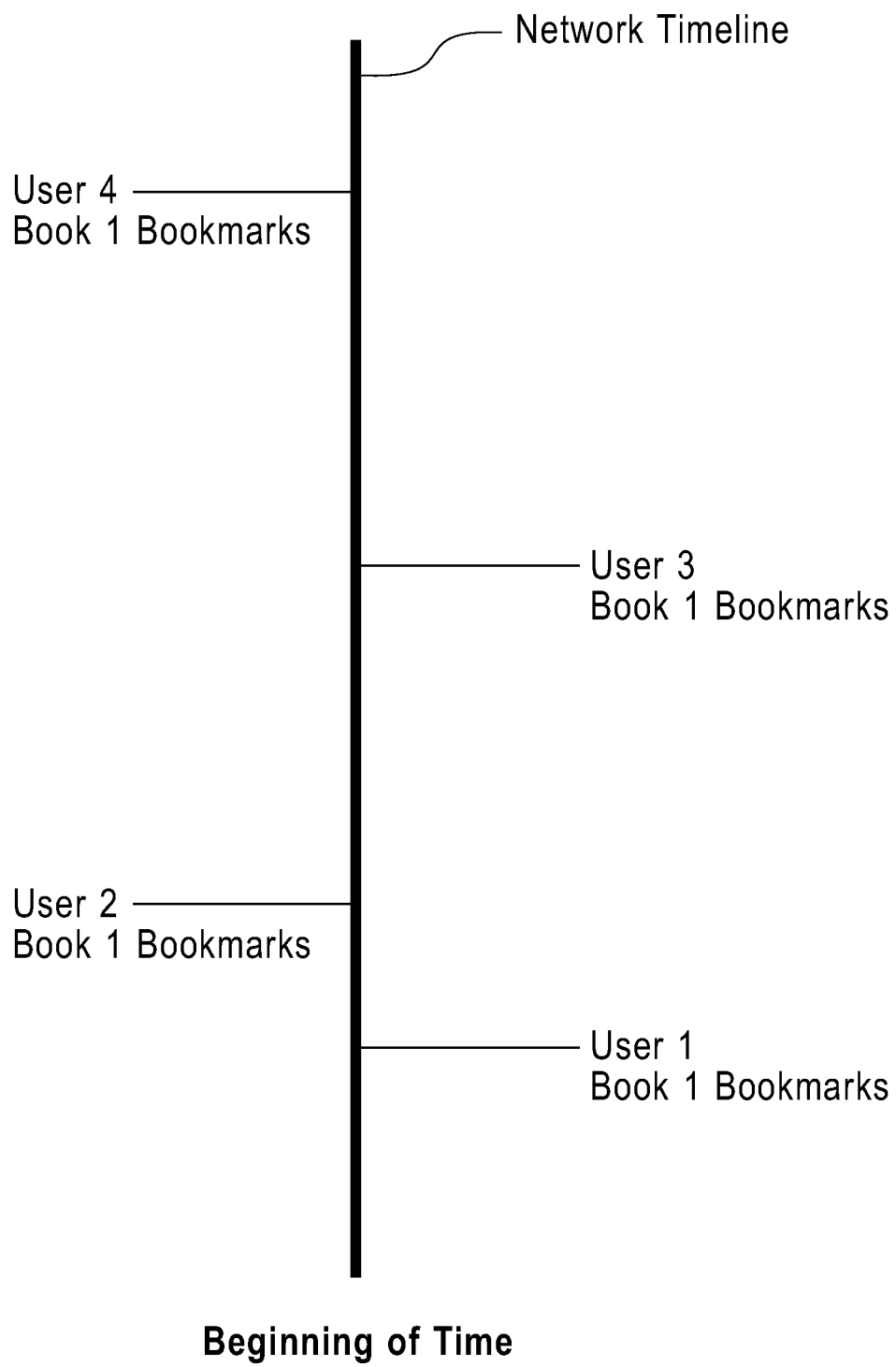
FIG. 4 shows a network timeline according to an embodiment of the present invention.

Referring to FIG. 4, shown is yet another embodiment of the present invention. With the growth of social networking and e-commerce bookmarks can be shared with other users reading the same text. FIG. 4 depicts a bookmark timeline for a book. A first user creates a series of bookmarks. A second user creates a second set of bookmarks. However, the second user also has the ability to review the bookmarks set by the first user. Users 3-N have the same capability as the first two users. Each of the users can create bookmarks and review of the bookmarks of all previous users. The bookmarks may be stored on both on the book and a network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Objective-C, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
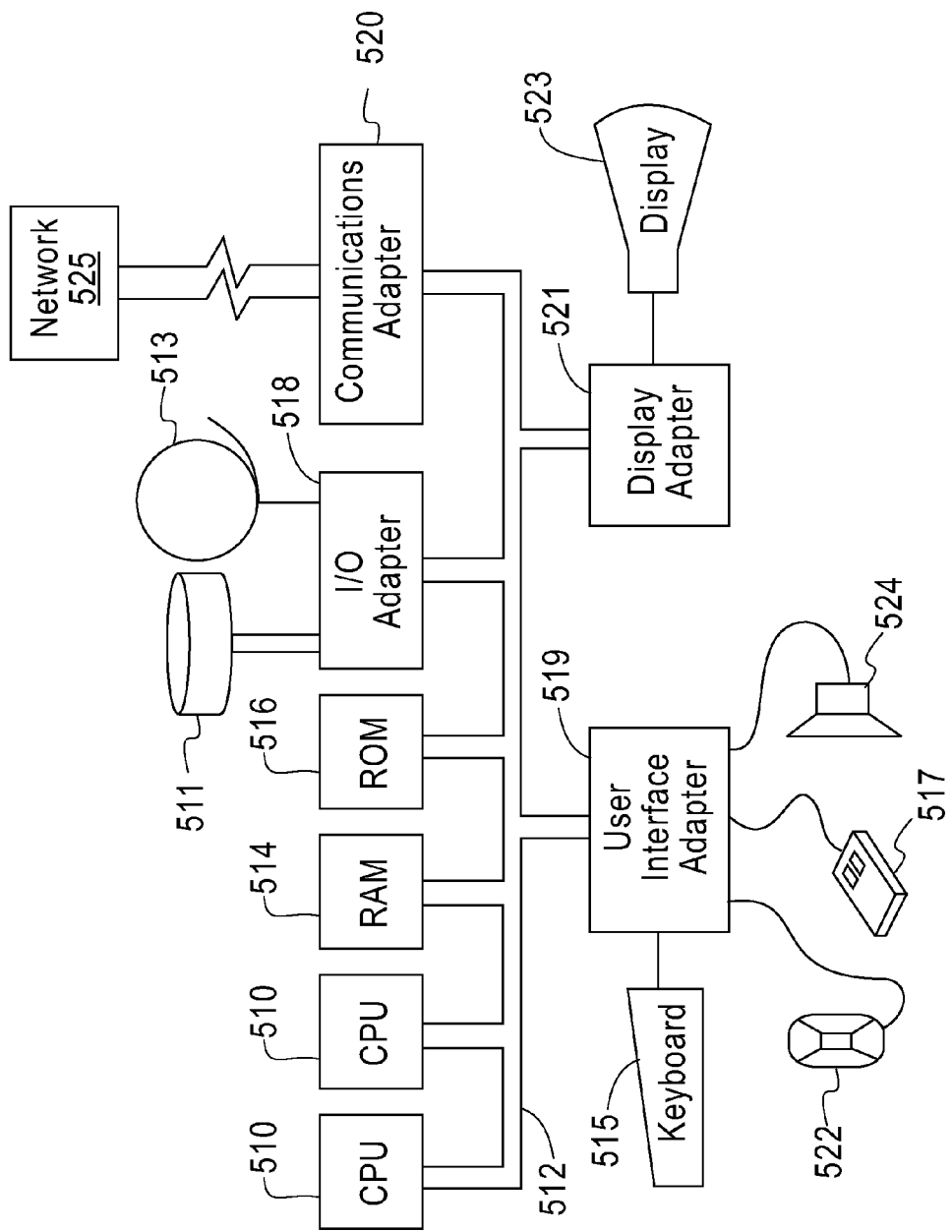
FIG. 5 illustrates a hardware configuration according to an embodiment of the present invention.

Referring now to FIG. 5, this schematic drawing illustrates a hardware configuration of an information handling/computer system in accordance with the embodiments of the invention. The system comprises at least one processor or central processing unit (CPU) 510. The CPUs 510 are interconnected via system bus 512 to various devices such as a random access memory (RAM) 514, read-only memory (ROM) 516, and an input/output (I/O) adapter 518. The I/O adapter 518 can connect to peripheral devices, such as disk units 511 and tape drives 513, or other program storage devices that are readable by the system. The system can read the inventive instructions on the program storage devices and follow these instructions to execute the methodology of the embodiments of the invention. The system further includes a user interface adapter 519 that connects a keyboard 515, mouse 517, speaker 524, microphone 522, and/or other user interface devices such as a touch screen device (not shown) to the bus 512 to gather user input. Additionally, a communication adapter 520 connects the bus 512 to a data processing network 525, and a display adapter 521 connects the bus 512 to a display device 523 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    generating a plurality of bookmarks to provide visual indications of placement within an electronic book of a computer;
    configuring the plurality of bookmarks to have multiple functions including to record recordable media content;
    configuring at least one bookmark of the plurality of bookmarks within the electronic book to have an image based on said placement, wherein the plurality of bookmarks are displayed next to a current user's viewing text to indicate bookmarked pages before and after any currently viewed text;
    storing the plurality of bookmarks of the electronic book as a first set for a first user;
    generating subsequently in time, a second set of a plurality of bookmarks of the electronic book for a second user; and
    sharing the first set of the plurality of bookmarks of the electronic book with the second user, wherein the visual indications of placement of the first set of the plurality of bookmarks are displayed for the second user, and wherein the second user has access to the recorded media content of the first set of the plurality of bookmarks.

2. The method according to claim 1, wherein at least one of the multiple functions is a response to touch.

3. The method according to claim 1, wherein at least one of the multiple functions is a response to tap.

4. The method according to claim 1, wherein at least one of the multiple functions is a response to a proximity of an object.

5. The method according to claim 4, wherein said response to said proximity varies depending on the distance of said object.

6. The method according to claim 1, wherein at least one of the multiple functions is to provide an audio output.

7. The method according to claim 1, wherein said image is a portion of text located where the at least one bookmark of the plurality of bookmarks of the first set is placed.

8. The method according to claim 1, wherein said image is a visual icon representing a portion of text located where the at least one bookmark of the plurality of bookmarks of the first set is placed.

9. The method according to claim 1, further comprises the computer varying said placement of the at least one bookmark of the plurality of bookmarks of the first set, depending on where the first user or the second user is reading a specific section.

10. A computer system comprising:
    one or more processors, one or more computer-readable memories and one or more computer-readable, tangible storage devices;

a first module operatively coupled to at least one of the one or more storage devices for execution by at least one of the one or more processors via at least one of the one or more memories, configured to generate a plurality of bookmarks to provide visual indications of placement within an electronic book;

a second module coupled to at least one of the one or more storage devices for execution by at least one of the one or more processors via at least one of the one or more memories, configured to provide the plurality of bookmarks with multiple functions including to record recordable media content;

a third module operatively coupled to the at least one of the one or more storage devices for execution by the at least one of the one or more processors via the at least one of the one or more memories, configured to provide at least one bookmark of the plurality of bookmarks within the electronic book with an image based upon said placement, wherein the plurality of bookmarks are displayed next to a current user's viewing text to indicate bookmarked pages before and after any currently viewed text;

a fourth module coupled to the at least one of the one or more storage devices for storage of the plurality of bookmarks of the electronic book as a first set for a first user via at least one of the one or more memories;

a fifth module operatively coupled to the at least one of the one or more storage devices for execution by the at least one of the one or more processors via the at least one of the one or more memories, configured to generate subsequently in time, a second set of a plurality of bookmarks of the electronic book for a second user; and a sixth module coupled to the at least one of the one or more storage devices for execution by the at least one of the one or more processors via the at least one of the one or more memories, configured to share the first set of the plurality of bookmarks of the electronic book with the second user, wherein the visual indications of placement of the first set of the plurality of bookmarks are displayed for the second user, and wherein the second user has access to the recorded media content of the first set of the plurality of bookmarks.

11. The system according to claim 10, wherein at least one of the multiple functions is a response to touch.

12. The system according to claim 10, wherein at least one of the multiple functions is a response to tap.

13. The system according to claim 10, wherein at least one of the multiple functions is a response to a proximity of an object.

14. The system according to claim 13, wherein said response to said proximity varies depending on the distance of said object.

15. The system according to claim 10, wherein said image is a visual icon representing a portion of text located where the at least one bookmark of the plurality of bookmarks of the first set is placed.

16. The system according to claim 10, further comprises a seventh module configured to vary said placement of the at least one bookmark of the plurality of bookmarks of the first set is placed, depending on where the first user or the second user is reading a specific section.

17. A computer program product comprising:
one or more computer-readable, tangible non-transitory storage medium;

program instructions, stored on at least one of the one or more storage medium, to generate a plurality of bookmarks to provide visual indications of placement within an electronic book of a computer, program instructions, stored on at least one of the one or more storage medium, to provide the plurality of bookmarks with multiple functions including to record recordable media content, program instructions, stored on at least one of the one or more storage medium, to provide at least one bookmark of the plurality of bookmarks within the electronic book with an image based upon placement for the at least one bookmark, wherein the plurality of bookmarks are displayed next to a current user's viewing text to indicate bookmarked pages before and after any currently viewed text, program instructions, stored on at least one of the one or more storage medium, to store the plurality of bookmarks of the electronic book as a first set for a first user;

program instructions, stored on at least one of the one or more storage medium, to generate subsequently in time, a second set of a plurality of bookmarks of the electronic book for a second user; and program instructions, stored on at least one of the one or more storage medium, to share the first set of the plurality of bookmarks of the electronic book with the second user, wherein the visual indications of placement of the first set of the plurality of bookmarks are displayed for the second user, and wherein the second user has access to the recorded media content of the first set of the plurality of bookmarks.

18. The computer program product according to claim 17, wherein at least one of the multiple functions is a response to a proximity of an object.

19. The computer program product according to claim 18, wherein said response to said proximity varies depending on the distance of said object.

20. The computer program product according to claim 17, wherein said image is a visual icon representing a portion of text located where the at least one bookmark of the plurality of bookmarks of the first set is placed.

21. The computer program product according to claim 17, further comprises program instructions, stored on at least one of the one or more storage medium, to vary said placement of the at least one bookmark of the plurality of bookmarks of the first set, depending on where the first user or the second user is reading a specific section.

* * * * *